US012770589B2

(12) United States Patent
Yu et al.

(10) Patent No.: US 12,770,589 B2
(45) Date of Patent: Oct. 20, 2026

(54) DISPLAY METHOD FOR COLLECTIVELY CHANGING DISPLAY CONTENTS OF A TRANSPORTATION VEHICLE, AND SMART DISPLAY DEVICE AND NON-TRANSITORY COMPUTER-READABLE RECORDING MEDIUM THEREOF

(71) Applicant: COMPAL ELECTRONICS, INC., Taipei (TW)

(72) Inventors: Chun-Yen Yu, Taipei (TW); Ting-Wei Wu, Taipei (TW); Chuan-Yu Liu, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 103 days.

(21) Appl. No.: 18/822,315

(22) Filed: Sep. 2, 2024

(65) Prior Publication Data

US 2025/0078778 A1 Mar. 6, 2025

Related U.S. Application Data

(60) Provisional application No. 63/603,103, filed on Nov. 27, 2023, provisional application No. 63/536,931, filed on Sep. 6, 2023.

(51) Int. Cl.
*G09G 5/02* (2006.01)
*B60Q 1/00* (2006.01)
(Continued)

(52) U.S. Cl.
CPC ............. *G09G 5/02* (2013.01); *B60Q 1/0076* (2013.01); *B60Q 1/5035* (2022.05); *B60Q 1/52* (2013.01);
(Continued)

(58) Field of Classification Search
CPC ...... G09G 5/02; G06V 40/10; G06Q 30/0266; B60Q 1/545; B60Q 1/543; B60Q 1/5024; B60Q 1/0076; B60Q 1/52; B60Q 1/54
See application file for complete search history.

(56) References Cited

U.S. PATENT DOCUMENTS 10,783,559 B1 * 9/2020 Tran ........................ H04W 4/40
2015/0197248 A1 * 7/2015 Breed .............. G08G 1/096775 340/905

(Continued)

FOREIGN PATENT DOCUMENTS

AU 2009201486 A1 * 11/2010 ................ G01P 1/07

*Primary Examiner* — Jonathan R Messmore

(57) ABSTRACT

A display method and a smart display device for collectively changing display contents of a shell body of a transportation vehicle are provided, including setting first display contents of the display element for normal display; setting second display contents of the display element being different from the first display contents; obtaining positioned locations of a plurality of the transportation vehicles by a central control system. When any transportation vehicle satisfies a predetermined condition, the central control system issues the display control signal to the transportation vehicle according to the positioned location, and the smart display device of the transportation vehicle automatically receives the display control signal for the display element to change the first display contents to the second display contents, so that one or more of the transportation vehicles can collectively change the display contents.

16 Claims, 17 Drawing Sheets

(51) Int. Cl.

| | |
|---|---|
| ***B60Q 1/50*** | (2006.01) |
| ***B60Q 1/52*** | (2006.01) |
| ***B60Q 1/54*** | (2006.01) |
| ***G06Q 30/0251*** | (2023.01) |
| ***G06V 40/10*** | (2022.01) |

(52) U.S. Cl.
CPC ............... *B60Q 1/54* (2013.01); *B60Q 1/543* (2022.05); *B60Q 1/545* (2022.05); *G06Q 30/0266* (2013.01); *G06V 40/10* (2022.01); *B60Q 2400/00* (2013.01); *G09G 2320/0666* (2013.01); *G09G 2354/00* (2013.01); *G09G 2380/10* (2013.01)

(56) References Cited

U.S. PATENT DOCUMENTS

| | | | | |
|---|---|---|---|---|
| 2020/0167825 | A1* | 5/2020 | Otsuka | G09F 21/048 |
| 2020/0262377 | A1* | 8/2020 | Salter | B60Q 1/2661 |
| 2020/0349628 | A1* | 11/2020 | Sazan | G06T 7/13 |
| 2021/0312661 | A1* | 10/2021 | Kojima | G06V 20/56 |
| 2022/0396201 | A1* | 12/2022 | Margetson | B60K 35/60 |
| 2022/0410795 | A1* | 12/2022 | Tatara | F21S 43/15 |
| 2022/0415222 | A1* | 12/2022 | Christiansen | B60K 35/50 |
| 2023/0259975 | A1* | 8/2023 | Koo | G06Q 30/0276<br>705/14.63 |

* cited by examiner

DISPLAY METHOD FOR COLLECTIVELY CHANGING DISPLAY CONTENTS OF A TRANSPORTATION VEHICLE, AND SMART DISPLAY DEVICE AND NON-TRANSITORY COMPUTER-READABLE RECORDING MEDIUM THEREOF

CROSS-REFERENCE TO RELATED APPLICATION

This non-provisional application claims priority under 35 U.S.C. § 119(e) on U.S. provisional Patent Application Nos. 63/536,931 and 63/603,103, filed on Sep. 6, 2023 and Nov. 27, 2023, respectively, the entire contents of which are hereby incorporated by reference.

BACKGROUND OF THE INVENTION

1. Field of the Invention

The present disclosure relates to a technique for changing display contents of a body shell of a transportation vehicle, and in particular to a display method for collectively changing display contents of a transportation vehicle, and a smart display device and a non-transitory computer-readable storage medium thereof.

2. Description of the Related Art

The appearance of a vehicle body of a conventional vehicle is usually based on the shape of a body shell and then presented in coordination with a painted vehicle color, or even further sprayed or transferred with a pattern. At this point, the appearance of the vehicle body is substantially fixed. Although the appearance of the vehicle body can be changed by altering the pattern or by repainting, such process is time and labor consuming and quick adjustment cannot be achieved.

Moreover, even if an electronic display element is mounted on a body shell of a vehicle, display contents can be adjusted only for appearances of vehicle bodies of individual vehicles. In the need of collectively changing display contents for a group of vehicles such as a vehicle convoy, for example, when a vehicle joins a specific convoy and needs to temporarily change into an appearance of a vehicle affiliated with the vehicle convoy, when vehicles need to collectively change into appearances containing warning signs in the event of a large-scale emergency incident, or when vehicles need to temporarily change into appearances displaying a warning in the event of a vehicle accident in the surroundings, the electronic display element mounted on the vehicle is unable to satisfy the needs above due to the lack of a central control mechanism.

Therefore, it is an object of the present disclosure to provide a solution for solving the above issues of the prior art.

BRIEF SUMMARY OF THE INVENTION

To overcome the issues above, the present disclosure provides a display method for collectively change display contents of a transportation vehicle, and a smart display device and a non-transitory computer-readable storage medium thereof, so enable transportation vehicles to collectively change display contents.

To achieve the object above, the present disclosure provides a display method for collectively changing display contents of a transportation vehicle. A body shell of the transportation vehicle includes a display element, and the changing of the display contents is performed by a smart display device. The display method includes: setting first display contents of the display element for the display element to display the first display contents; setting second display contents of the display element, the second display contents being different from the first display contents; obtaining positioned locations of a plurality of the transportation vehicles by a central control system; and when any one of the transportation vehicles satisfies a predetermined condition, the central control system issuing a display control signal to the transportation vehicle according to the positioned location, and the smart display device of the transportation vehicle automatically receiving the display control signal for the display element to change the first display contents to the second display contents, so that one or more of the transportation vehicles to can collectively change the display contents.

In one embodiment, the first display contents or the second display contents are one or a combination of two or more of a color, a sign, a text and a pattern, and at least one of the color, the sign, the text and the pattern of the second display contents is different from the first display contents.

In one embodiment, the plurality of transportation vehicles set a gathering range according to the positioned location of at least one of the transportation vehicles, and the predetermined condition is satisfied by any one of the plurality of transportation vehicles entering the gathering range, and at this point, the display element of the transportation vehicle receiving the display control signal within the gathering range individually changes the first display contents to the same second display contents.

In one embodiment, when any one of the transportation vehicles within the gathering range automatically receives the display control signal, a user of the transportation vehicle performs a confirmation for allowing the changing of the display contents via an operating interface, and the display element then changes the first display contents to the second display contents.

In one embodiment, the plurality of transportation vehicles are currently traveling, the positioned location of at least one of the transportation vehicles is defined as an accident location, the predetermined condition is satisfied by the transportation vehicle with a direction of travel away from the accident location, and the display element of the transportation vehicle changes the first display contents to the second display contents, so as to display the second display contents to the transportation vehicle in a direction of travel approaching the accident location.

In one embodiment, the plurality of transportation vehicles are traveling or still, the predetermined condition is satisfied by the plurality of transportation vehicles located at a geographic location with an occurrence of a disaster, the central control system issues the display control signal to any one of the transportation vehicles at the geographic location, and the display element of the transportation vehicle that receives the display control signal individually changes the first display contents to the same second display contents.

In one embodiment, the predetermined condition is satisfied by the plurality of transportation vehicles traveling sequentially toward a same path, the plurality of transportation vehicles receive the control signal according to a speed of travel, and the display elements of the plurality of transportation vehicles change the first display contents to the second display contents capable of displaying the speed of travel.

In one embodiment, when the plurality of transportation vehicles display the second display contents, each of the plurality of transportation vehicles displays the speed of travel in a color gradient according to a speed thereof.

In one embodiment, each of the transportation vehicles is arranged with an impact sensor on the body shell thereof, each of the transportation vehicles generates an impact signal triggered by an impact against the impact sensor, and the smart display device receives the impact signal and displays the second display contents by the display element thereof, wherein the second display contents are in significant contrast with the first display contents.

In one embodiment, each of the transportation vehicles includes a plurality of the impact sensors uniformly distributed on the body shell thereof, the smart display device defines a damaged region on the body shell according to the impact signal received, the second display contents at least include the signal and/or text, and each of the transportation vehicles displays the second display contents in a region other than the damaged region.

In one embodiment, each of the transportation vehicles is provided with an attitude sensor operable to detect a first attitude in normal use and to detect a second attitude different from the first attitude, and the sign and/or the text of the second display contents is displayed in orthographic projection when the attitude sensor detects that the vehicle where it is located is at the first attitude; alternatively, when the attitude sensor detects that the transportation vehicle where it is located is at the second attitude, the sign and/or the text of the second display contents is adjusted according to an angle difference and/or orientation difference of the second attitude with respect to the first attitude and is similarly displayed in orthographic projection.

In one embodiment, each of the transportation vehicles is provided with an identity identification element operable to identify identity information of a user, the predetermined condition is satisfied by the user with a designation provided by the authorized administrator according to the identity information, and the central control system displays the second display contents at the transportation vehicle where the user is located according to the designation.

In one embodiment, the identity identification element is an image identification element operable to capture and identify an image of the user so as to generate the identification information.

In one embodiment, the second display contents are bound to advertising information paid by a partner merchant, the advertising information is at least one of advertisement broadcast, brand promotion and commercial promotion, and when the positioned location of any one of the transportation vehicles obtained by the central control system is within an advertising region of the partner merchant, the transportation vehicle displays the second display contents.

The present disclosure further provides a non-transitory computer-readable recording medium for the method above. The non-transitory computer-readable recording medium stores a program having a plurality of executable codes for a smart display device to perform the method above when the executable codes are read by the smart display device.

The present disclosure further provides a smart display device for collectively changing display contents of a transportation vehicle. The smart display device includes: a display element, disposed on a body shell of the transportation vehicle, operable to display first display contents and second display contents; and a smart processing unit, electrically connected to the display element, operable to set the first display contents and the second display contents different from the first display contents; wherein the smart processing units of a plurality of the transportation vehicles are operable to be communicatively connected to a central control system, each of the transportation vehicles includes a positioning unit operable to provide a positioned location to the central control system, when any one of the transportation vehicle satisfies a predetermined condition, the central control system issues a display control signal to the transportation vehicle according to the positioned location, the smart processing unit automatically receives the display control signal for the display element to change the first display contents to the second display contents, so that one or more of the transportation vehicles can collectively change the display contents.

In one embodiment, the transportation vehicles is arranged with one or more impact sensors on a body shell thereof, the impact sensor is electrically connected to the smart processing unit, the transportation vehicles generates an impact signal triggered by an impact against the impact sensor, and the smart processing unit receives the impact signal and displays the second display contents by the display element thereof, wherein the second display contents are in significant contrast with the first display contents.

In one embodiment, each of the transportation vehicles is provided with an attitude sensor operable to detect a first attitude in normal use and to detect a second attitude different from the first attitude, and the second display contents are displayed when the attitude sensor detects that the vehicle where it is located is at the first attitude; alternatively, when the attitude sensor detects that the transportation vehicle where it is located is at the second attitude, the second display contents are adjusted according to an angle difference and/or orientation difference of the second attitude with respect to the first attitude and are similarly displayed in orthographic projection.

In one embodiment, each of the transportation vehicles is provided with an identity identification element operable to identify identity information of a user, the predetermined condition is satisfied by the user with a designation provided by the authorized administrator according to the identity information, and the central control system displays the second display contents at the transportation vehicle where the user is located according to the designation.

In one embodiment, the identity identification element is an image identification element operable to capture and identify an image of the user so as to generate the identification information.

Thus, in the event of a requirement of collectively changing display contents of a group of vehicles, by performing the display method, the smart display device of the present disclosure obtains positioned locations of a plurality of transportation vehicles by the central control system. Moreover, according to when the predetermined condition capable of meeting the requirement is satisfied, the central control system issues the display control signal that is then automatically received by the transportation vehicles at the positioned locations. The display elements of the transportation vehicles receiving the display control signal can all change the first display contents to the second display contents, hence achieving the effects of collectively changing display contents of the transportation vehicles and allo wing the display contents of the transportation vehicles to be consistent in order to meet the requirement.

DETAILED DESCRIPTION OF THE INVENTION

To facilitate understanding of the object, characteristics and effects of this present disclosure, embodiments together with the attached drawings for the detailed description of the present disclosure are provided.

Figure 1:
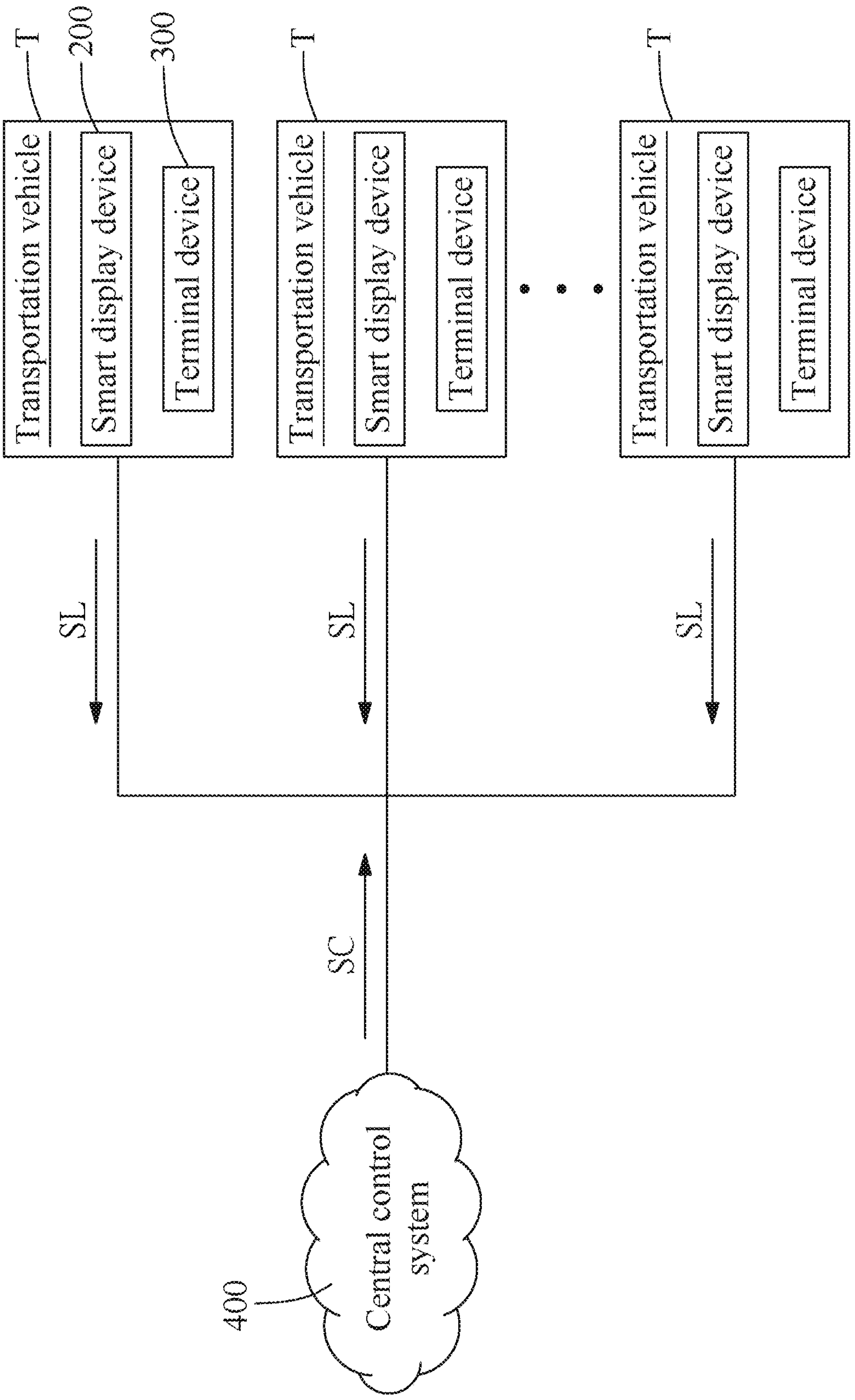
FIG. 1 is a block diagram of execution for collectively changing display of transportation vehicles according to a specific embodiment of the present disclosure.
Figure 2:
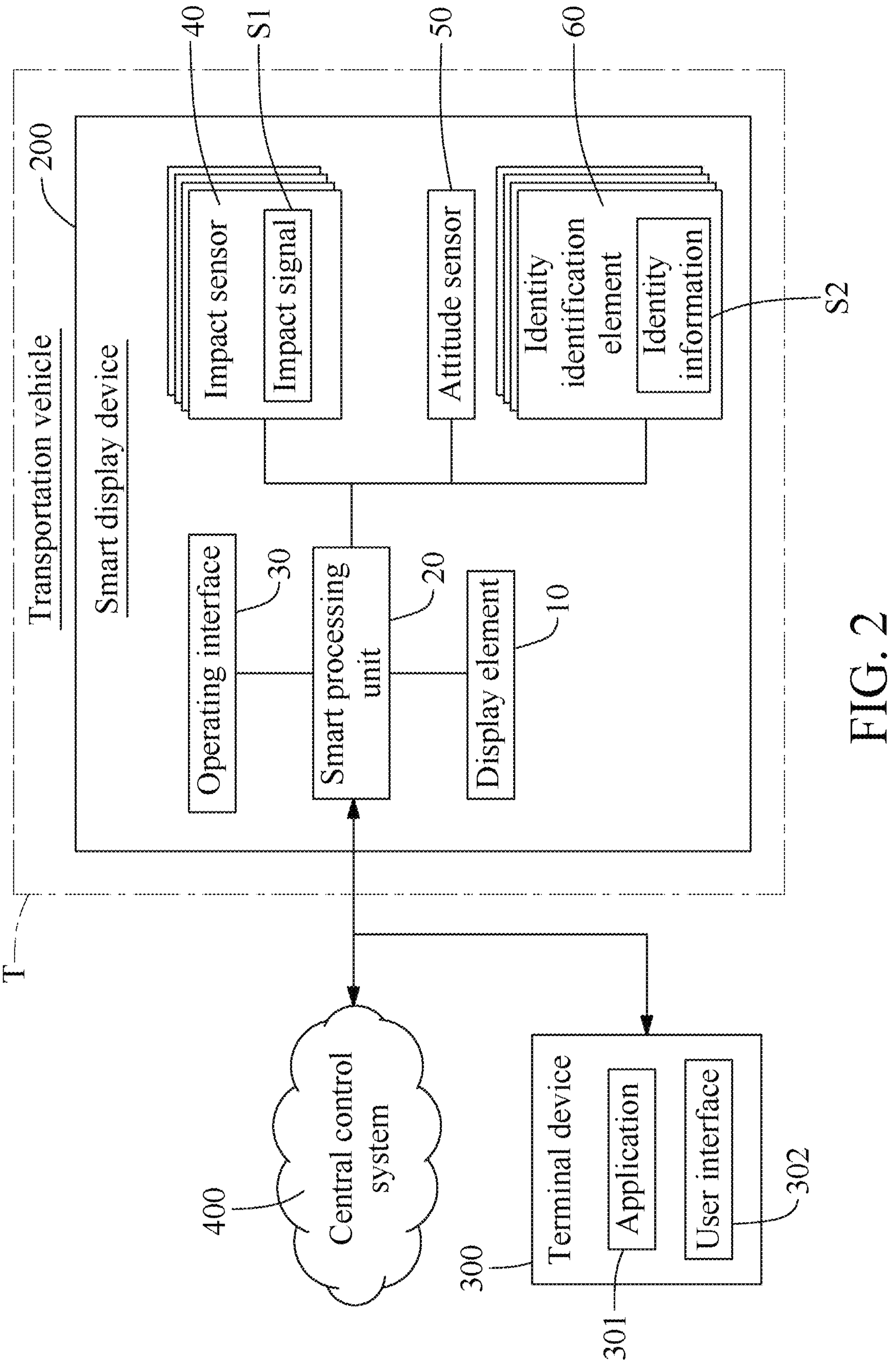
FIG. 2 is a block diagram of a system for collectively changing display of transportation vehicles according to a specific embodiment of the present disclosure.
Figure 3:
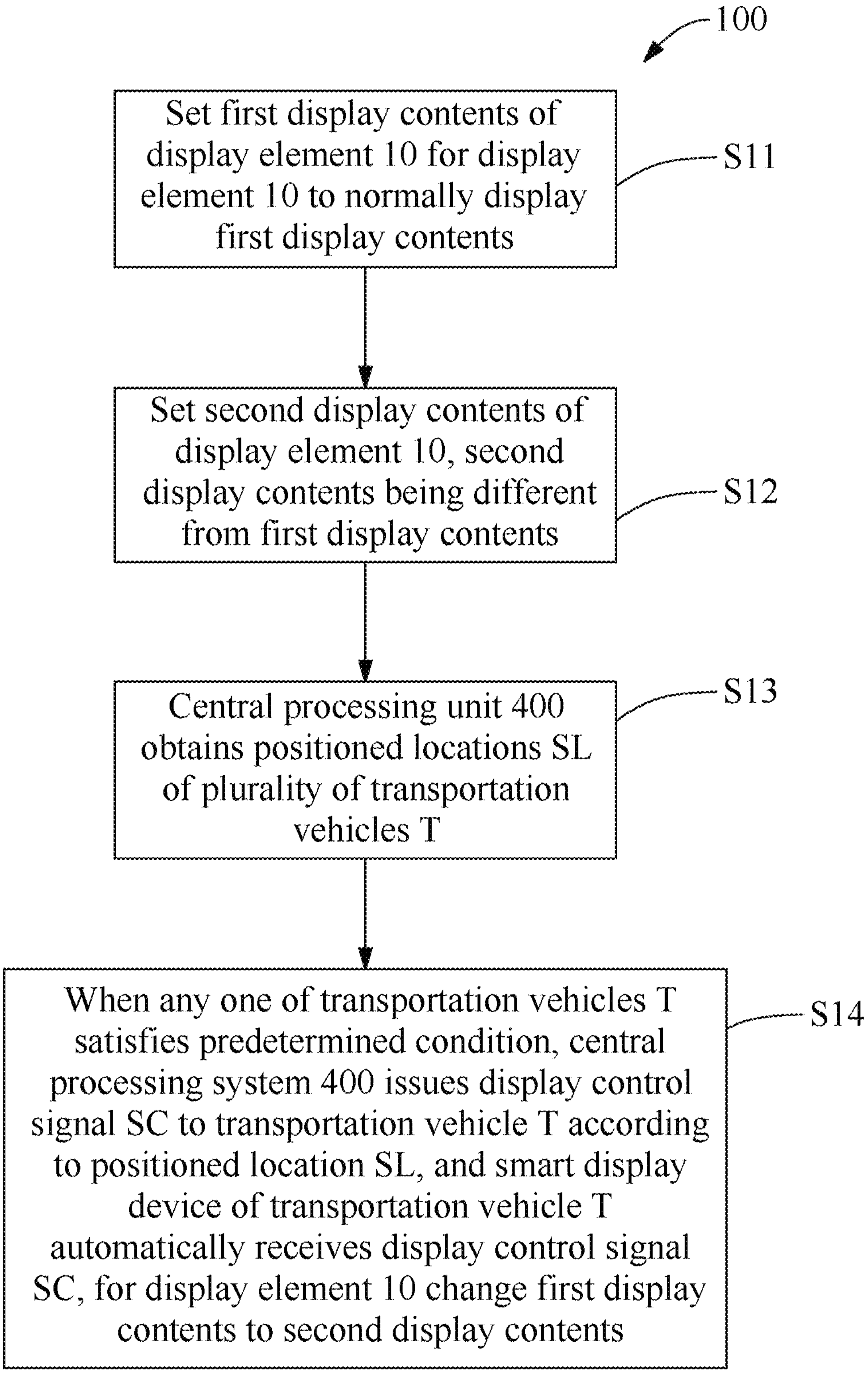
FIG. 3 is a flowchart of a display method according to a specific embodiment of the present disclosure.

Referring to FIG. 1 to FIG. 17, the present disclosure provides a display method 100 for collectively changing display contents of a transportation vehicle, a smart display device 200 and a non-transitory computer-readable storage medium thereof. A transportation vehicle T below is primarily described by taking a land vehicle (an automobile and/or a motorcycle) as an example. However, the transportation vehicle T described in the present is not limited to being a land vehicle, and an aircraft or a watercraft is also considered the transportation vehicle T of the present disclosure. Moreover, the transportation vehicle T referred to in the present disclosure has a positioning function for transmitting a positioned location to an exterior, and the transportation vehicle T is not limited to necessarily having a positioning apparatus. For example, the transportation vehicle T can also be a transportation vehicle T without any positioning apparatus but coordinates with a terminal device 300 (referring to FIG. 2) having a positioning function, or other apparatuses with a positioning function. The transportation vehicle T described in all the embodiments below is provided with the smart display device 200 and is thus operable to perform the display method 100.

The terminal device 300 can be a device connectable to the smart display device 200 in a wired or wireless manner by the Internet, and is for example, a smartphone, a tablet computer or a laptop computer. The terminal device 300 is mounted with an application 301 (referring to FIG. 2), and executes the application 301 so as to be communicatively connected to the smart display device 200. The terminal device 300 provides a user interface 302 while executing the application 301, and a user can operate the user interface 302 in order to start the display method 100 above.

The smart display device 200 is disposed on the transportation vehicle T and includes a display element 10 and a smart processing unit 20. The display element 10 is primarily disposed on a body shell of the transportation vehicle T and is electrically connected to the smart processing unit 20, and the smart processing unit 20 provides the display element 10 with display contents. In one embodiment, the smart processing unit 20 is communicatively connected to a driving system (not shown) of the transportation vehicle T, and changes the display contents of the display element 10 of the transportation vehicle T.

In the display method 100 for collectively changing display contents of the transportation vehicle performed by the smart display device 200, the smart display device 200 is communicatively connected to a central control system 400, the central control system 400 issues a display control signal SC to the transportation vehicle T according to a positioned location SP of the transportation vehicle T, and the smart processing unit 20 receives the display control signal SC and then provides the display element 10 and/or change the display contents of the display element 10. At this point, the central control system 400 is implemented by, for example but not limited to, a cloud host.

The display element 10 can be a display device attached along the body shell of the transportation vehicle T, and is, for example, generally known electronic paper disclosed by E-Ink Holdings Inc. In one embodiment, the body shell refers to sheet metal of a vehicle, and excludes glassware of a vehicle.

The display method 100 includes setting first display contents of the display element 10 for the display element 10 to normally display the first contents (step S11) such as a common vehicle color and sign. At this point, the first display contents include displaying a common appearance of a vehicle. The display method 100 further includes: setting second display contents of the display element 10, the second display contents being different from the first display contents (step S12); obtaining positioned locations SL of a plurality of the transportation vehicles T by the central control system 400 (step S13); and when any one of the transportation vehicles T satisfies a predetermined condition, the central control system 400 issuing the display control signal SC to the transportation vehicle T according to the positioned location SL, and the smart display device 200 of the transportation vehicle T automatically receiving the display control signal SC, for the display element 10 to change the first display contents to the second display contents, so that one or more of the transportation vehicles T can collectively change the display contents (step S14). The display method is performed by the smart display device 200 reading a plurality of executable codes. In one embodiment, the plurality of executable codes can be stored in a non-transitory computer-readable recording medium, so that the smart display device 200 is able to read from the non-transitory computer-readable recording medium and then execute these executable codes to perform changing of the display contents of the transportation vehicle T.

In one embodiment, the first display contents or the second display contents are one or a combination of two or more of a color, a sign, a text and a pattern, and at least one of the color, the sign, the text and the pattern of the second display contents is different from the first display contents. For example, assume that the first display contents are purely displaying a white appearance on the body shell of the transportation vehicle T, and the second display contents can be changing into an appearance in a different color, or similarly a white appearance but additionally displaying one of the sign, the text and the pattern, or similarly a white appearance but additionally displaying two or more of the sign, the text and the pattern, such that the second display contents are different from the first display contents. Details of changing the first display contents to the second display contents are to be specifically described below.

Specific embodiments are given below according to the implementation details of embodiment above.

Figure 4:
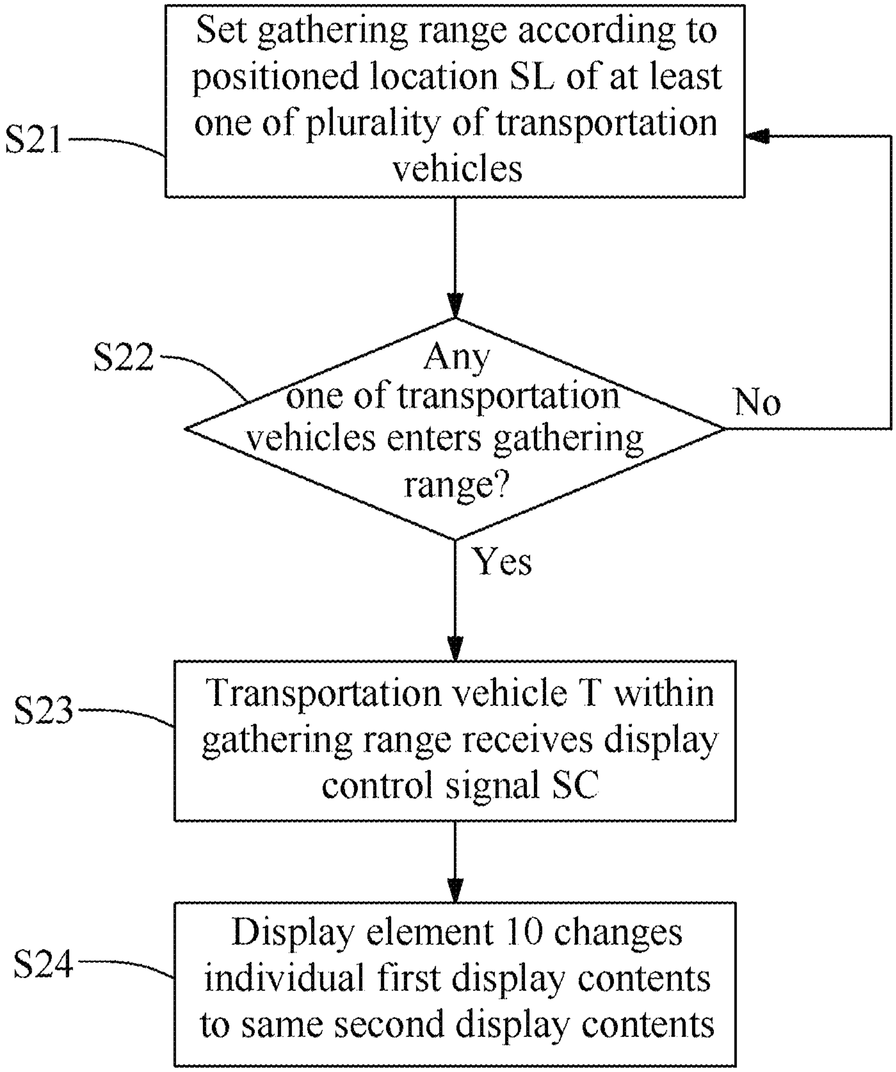
FIG. 4 is a flowchart of steps according to a first embodiment of the present disclosure.

FIG. 4 shows a flowchart of a display method according to a first embodiment of the present disclosure. In the display method 100 according to an embodiment of the present disclosure, a gathering range is set according to the positioned location SL of at least one of the plurality of transportation vehicles T (step S21), it is determined whether any one of the plurality of transportation vehicles T enters the gathering range (S22), and if a result of the determination is "yes", the predetermined condition is satisfied by the transportation vehicle T entering the gathering range, and the transportation vehicle within the gathering range receives the display control signal SC (S23). At this point, the display element 10 of the transportation vehicle T receiving the display control signal SC within the gathering range individually changes the first display contents to the same second display contents (step S24). If the result of the determination is "no", the display method 100 returns to step S21.

Figure 5:
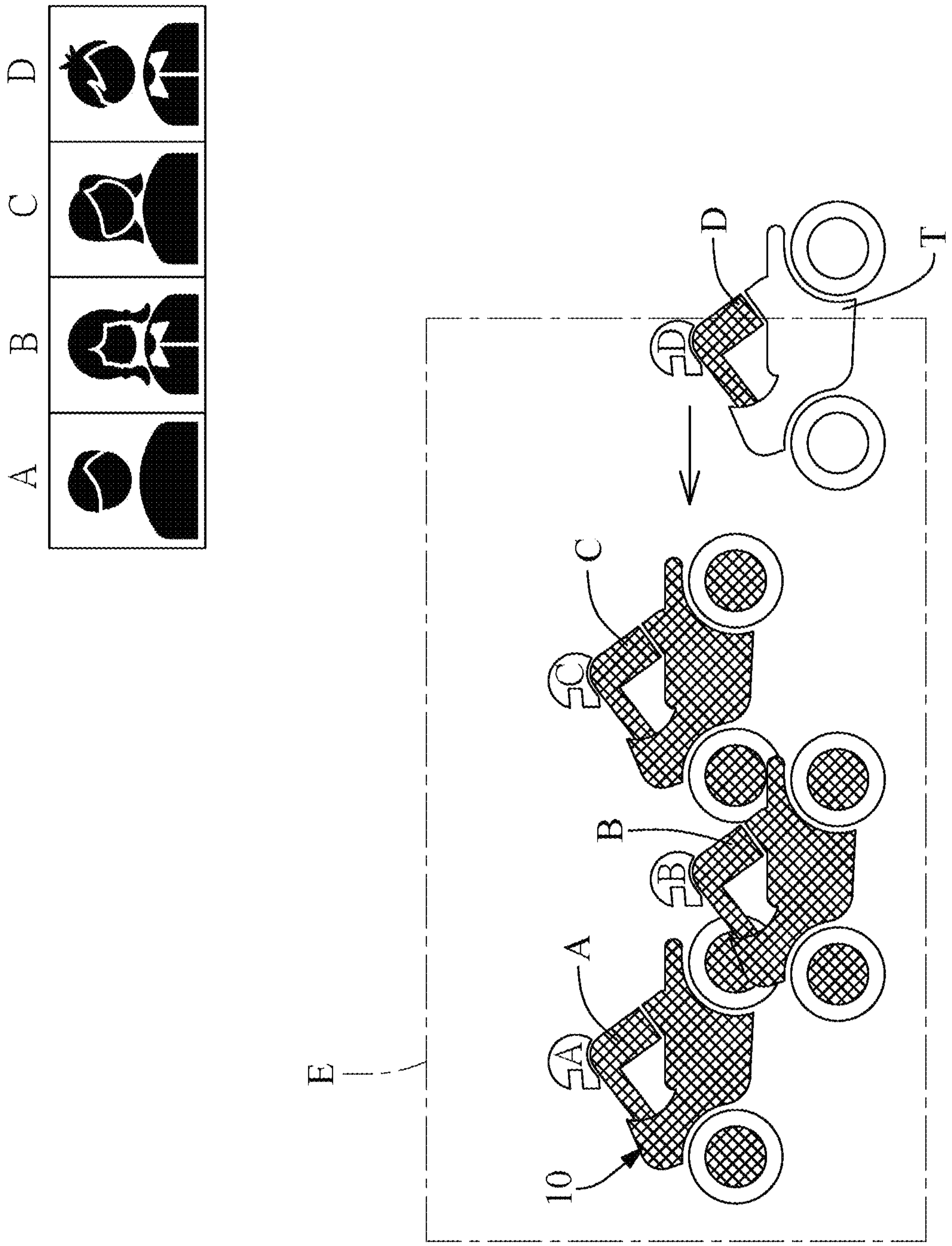
FIG. 5 is a schematic diagram of a scenario of transportation vehicles gathered as a vehicle convey according to the first embodiment of the present disclosure.
Figure 6:
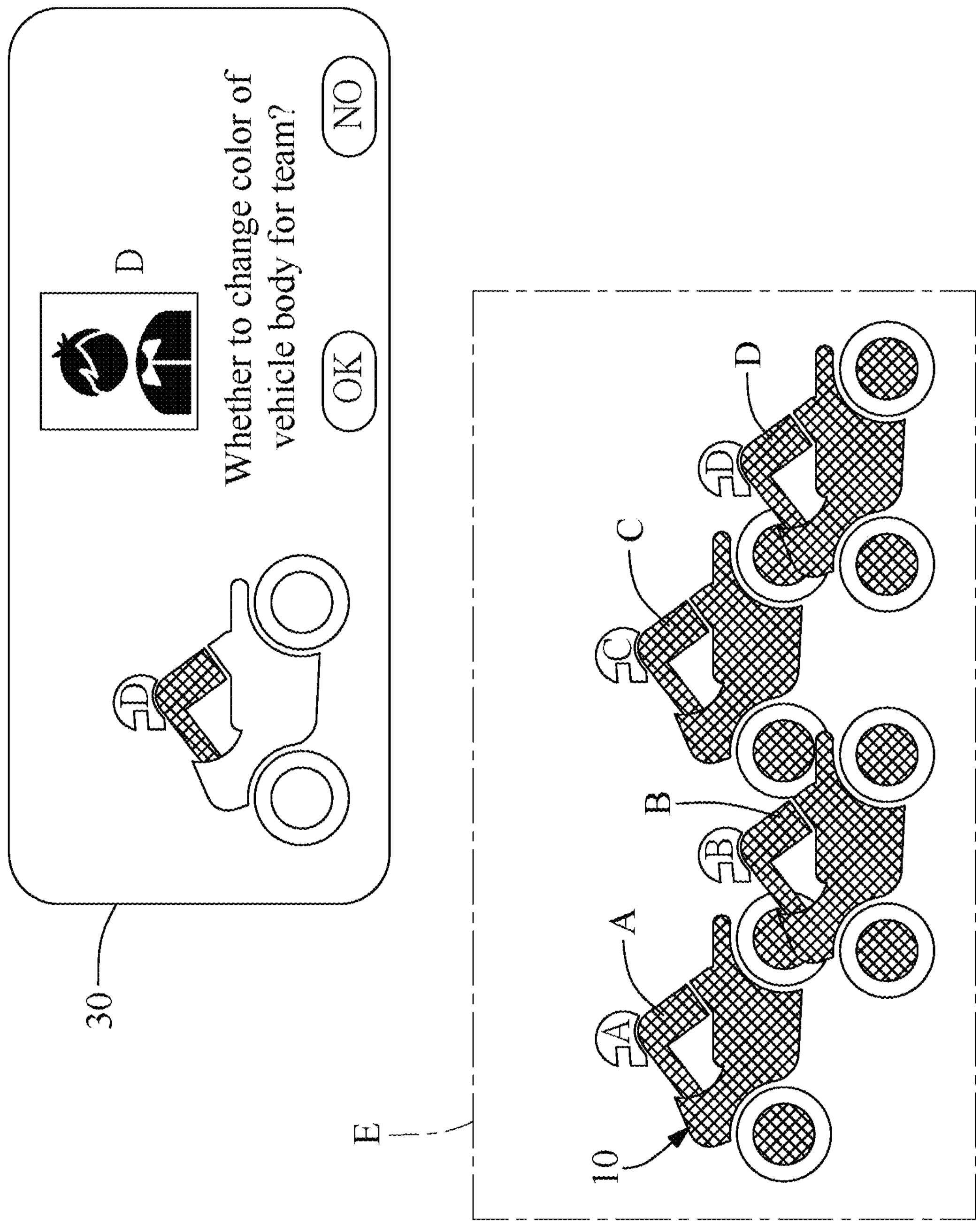
FIG. 6 is a schematic diagram of collectively changing display of transportation vehicles according to the first embodiment of the present disclosure.

As shown in FIG. 5 and FIG. 6, in the first embodiment, the transportation vehicle T is a motorcycle in this embodiment, in a scenario in which four motorcycles ridden by user A, user B, user C and user D are to gather into a vehicle convoy. Wherein, the first display contents of each of the motorcycles is an individual appearance of a vehicle body (for example, as indicated by the motorcycle ridden by user D in FIG. 5), and the second display contents are a unified appearance of vehicle bodies of the vehicle convoy (as indicated by grid lines representing the motorcycles ridden by user A to user C in FIG. 5). All of user A to user D of the four motorcycles carry smart phones (not shown). During riding, positioning can be performed and the positioned locations SL can be transmitted to the central control system 400, and all of the four motorcycles can receive the display control signal SC issued by the central control system 400. At this point, transmissions of the positioned locations SL and the display control signal SC are carried out via, for example, the Internet.

In continuation of the above, in the scenario of this embodiment, before the motorcycles are gathered, the display element 10 displays the individual appearance of a vehicle body as the first display contents. When these four motorcycles are to gather, assume that a position distanced 10 meters behind the positioned location SL of user A is to be set as the gathering range E according to the positioned location SL of user A as a reference, and the predetermined condition is satisfied by any one of the transportation vehicles T entering the gathering range E. At this point, according to the positioned locations SL returned in real-time by users B to D, when users B to D individually enter the gathering range E, the central control system 400 automatically issues the display control signal SC that is then individually received by users B to D, allowing the display elements 10 of the motorcycles ridden by users B to D to change the individual first display contents to the second display contents (as shown in changes in the display contents of the motorcycle of user D in FIG. 5 and FIG. 6). At this point, the display elements 10 of the motorcycles ridden by users A to D all display the same second display contents.

In the vehicle convoy in which the four motorcycles are gathered, when any one of users A to D within the gathering range automatically receives the display control signal SC, a confirmation for allowing changes in the display contents is carried out by an operating interface 30. As shown in FIG. 6, when user D enters the gathering range and receives the display control signal SC, the confirmation of "whether to change the color of vehicles of the team" is carried out by the operating interface 30. If "OK" is selected, the display element 10 then changes the first display contents to the second display contents.

Figure 7:
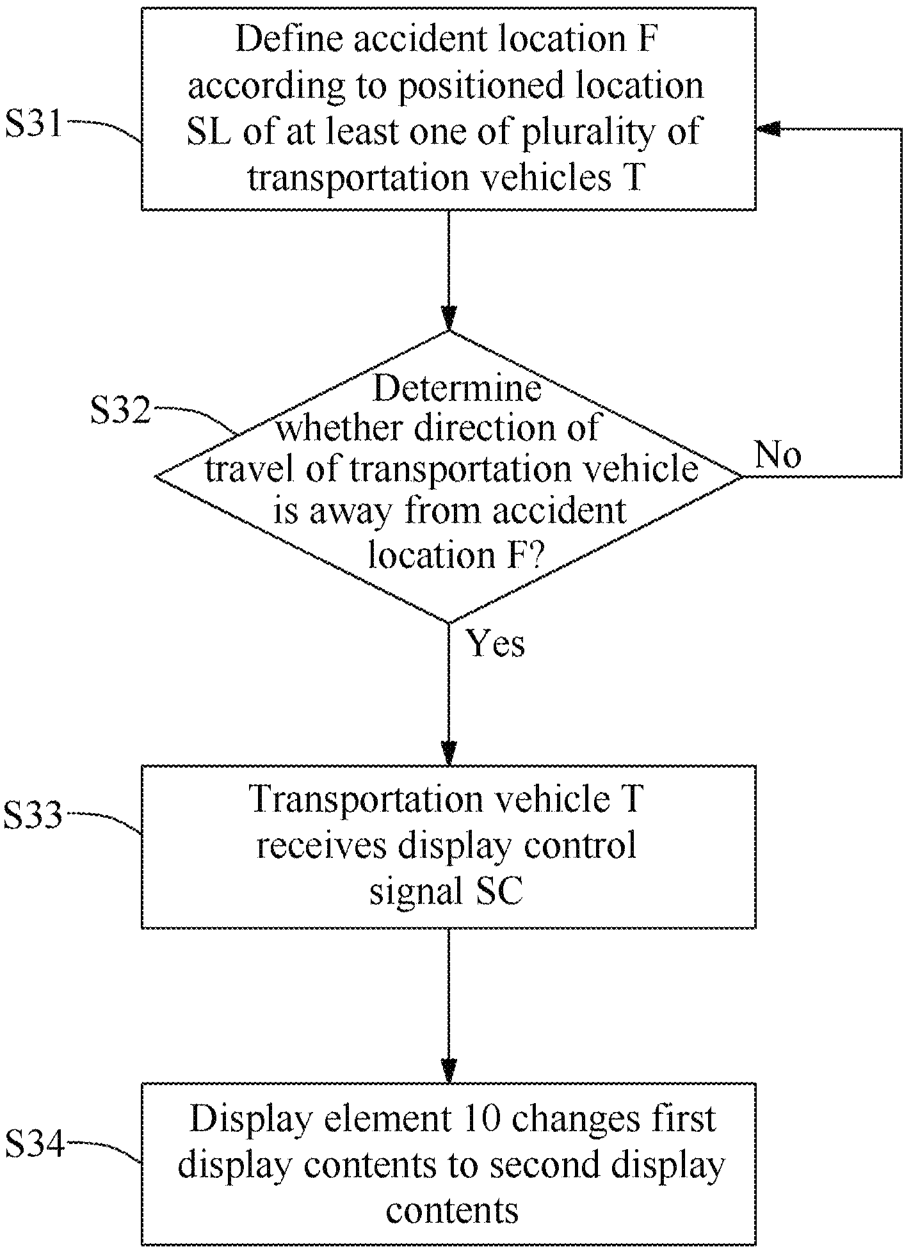
FIG. 7 is a flowchart of steps according to a second embodiment of the present disclosure.

FIG. 7 shows a flowchart of a display method according to a second embodiment of the present disclosure. The plurality of transportation vehicles T are currently traveling, the positioned location SD of at least one of the plurality of transportation vehicles T is defined as an accident location F (step S31), and it is determined whether a direction of travel of the transportation vehicle T is away from the accident location F (step S32). If a result of the determination is "yes", the predetermined condition is satisfied by the transportation vehicle T, the transportation vehicle T receives the display control signal SC (step S33), and the display element 10 thereof changes the first display contents to the second display contents (step S34), so as to display the second display contents to the transportation vehicle T traveling in a direction toward the accident location F. If the result of the determination is "no", the display method 100 returns to step S31.

Figure 8:
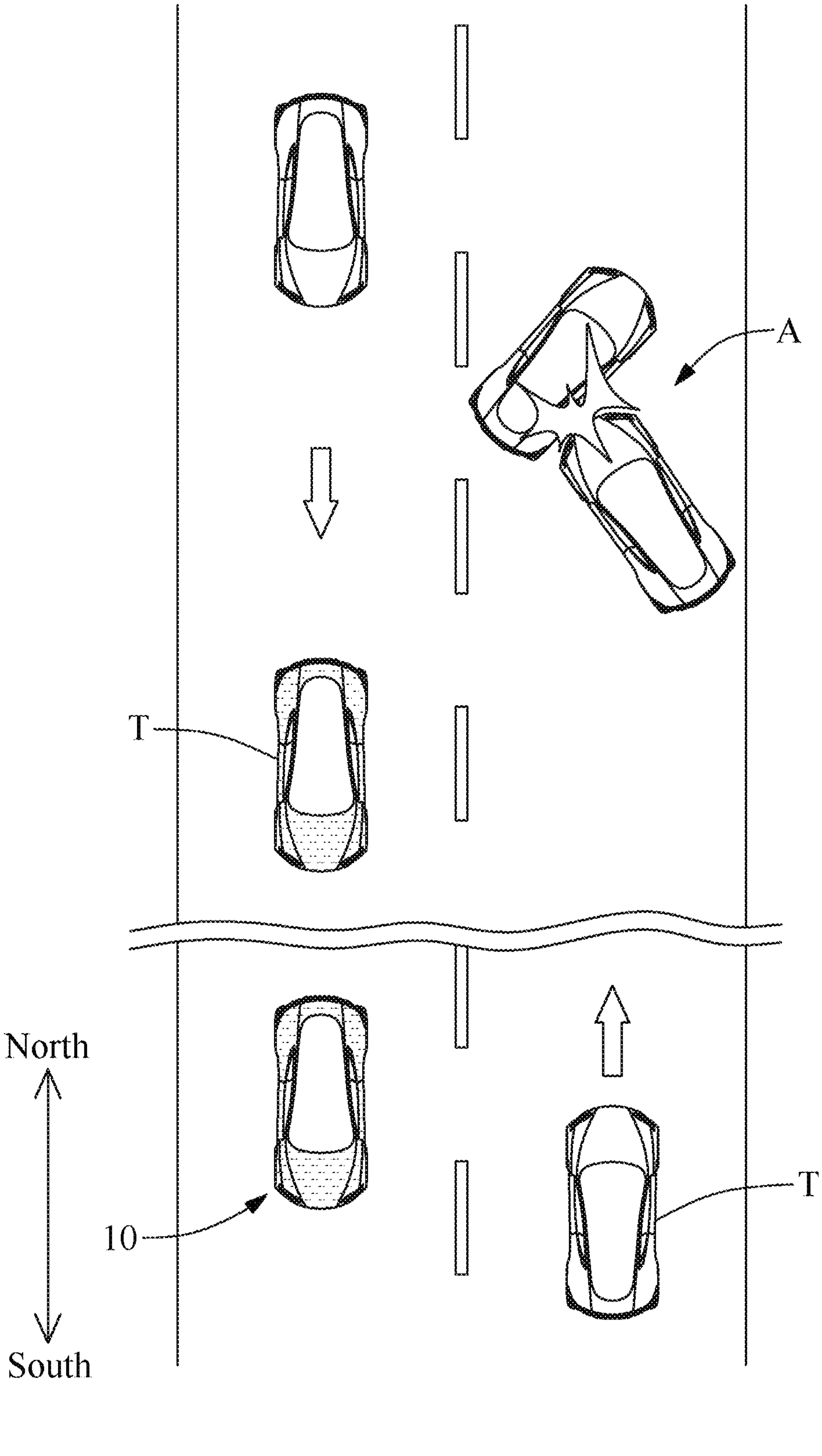
FIG. 8 is a schematic diagram of a scenario of an accident of transportation vehicles according to the second embodiment of the present disclosure.

As shown in FIG. 8, in the second embodiment, the plurality of transportation vehicles T in this embodiment are non-specific vehicles driving northbound and southbound on road lanes, in a scenario in which a collision of vehicles occurs at an accident location F on the northbound road, and the accident location F is acquired according to the positioned location SL returned by the vehicle of the accident to the central control system 400, so as to warn vehicles traveling in the same direction before the accident location F about the accident ahead. According to the positioned location SL returned by a non-specific vehicle on the road via the central control system 400, the predetermined condition is satisfied by the vehicle traveling southbound in a direction away from the accident location F, the vehicle automatically issues the display control signal SC which is then received by a vehicle traveling southbound and passing by the accident location F, so as to change the first display contents of the display element 10 to the second display contents, for example, changing a vehicle body to a warning color (for example, as vehicles traveling southbound having appearances of vehicle bodies indicated in dotted lines in FIG. 8), or further displaying text of "collision at XX km northbound", allowing vehicles still traveling before the accident location F to acquire the warning from the second display contents of the southbound vehicle and to slow down to prevent any occurrence of secondary collision.

Figure 9:
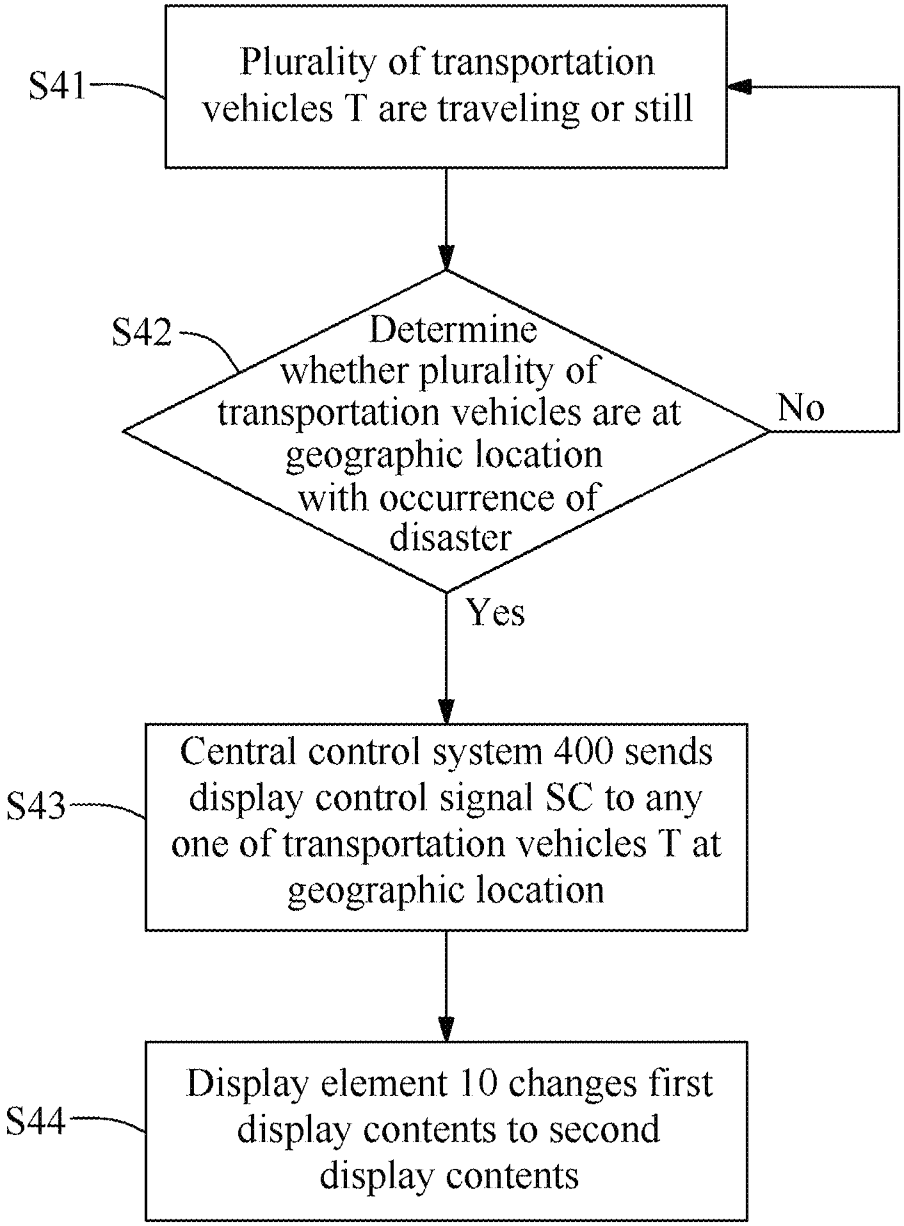
FIG. 9 is a flowchart of steps according to a third embodiment of the present disclosure.

FIG. 9 shows a flowchart of a display method according to a third embodiment of the present disclosure. The plurality of transportation vehicles T are traveling or still (step S41), and it is determined whether the plurality of transportation vehicles T are at a geographic location with an occurrence of a disaster (step S42). If a result of the determination is "yes", the predetermined condition is satisfied by the transportation vehicle T at the geographic location, the central control system 40 sends the display control signal SC to any one of the transportation vehicles T at the geographic location (step S43), and the display element 10 of the transportation vehicle T that receives the display control signal SC individually changes the first display contents to the same second display contents (step S44). If the result of the determination is "no", the display method 100 returns to step S41.

Figure 10A:
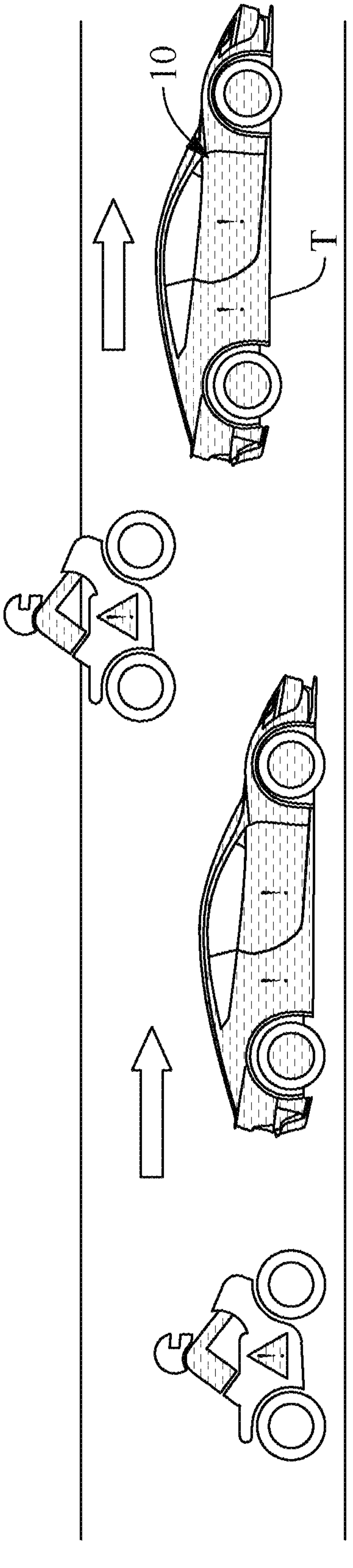
FIG. 10A and FIG. 10B are schematic diagrams of a scenario of a disaster of transportation vehicles according to the third embodiment of the present disclosure.
Figure 10B:
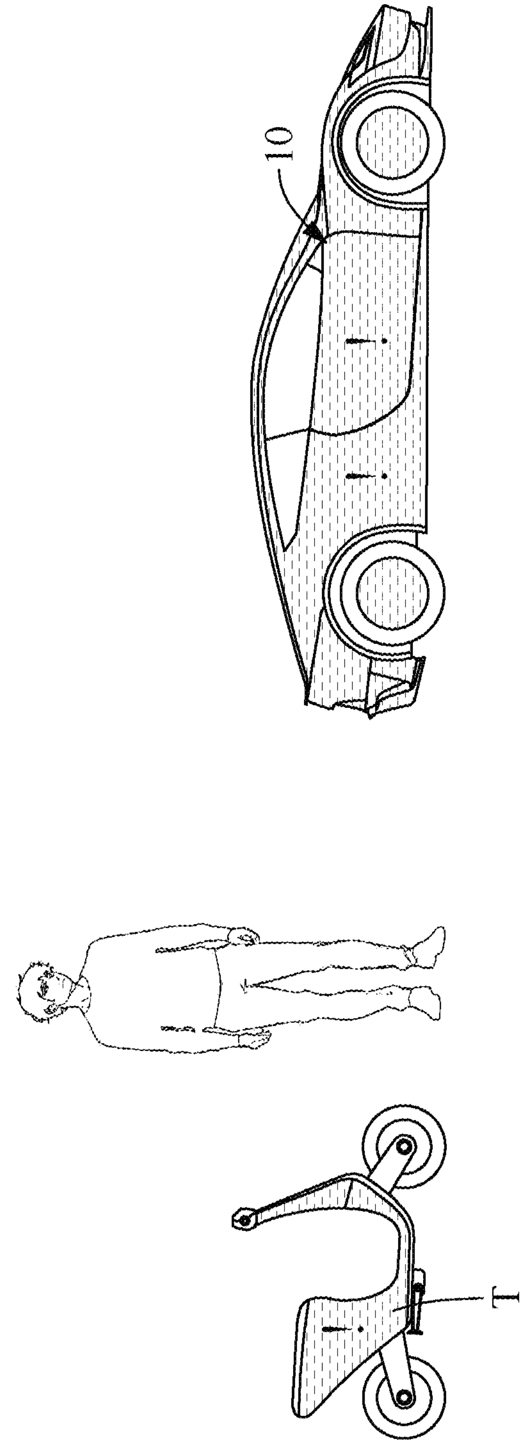

As shown in FIG. 10A and FIG. 10B, in the third embodiment, the plurality of transportation vehicles T in this embodiment are non-specific motor vehicles (including cars and motorcycles) traveling on the road (referring to FIG. 10A) and non-specific motor vehicles parked on the side of the road and being still (referring to FIG. 10B), in a scenario of a national disaster warning message for such as an earthquake or a tsunami at the geographic location, the geographic location can be national or regional, and the predetermined condition is satisfied by the non-specific motor vehicles at this geographic location. At this point, according to the positioned location SL returned in real-time by the non-specific motor vehicles located nationally or regionally, the central control system 400 can automatically issue the display control signal SC which is then received by the non-specific motor vehicles at the geographic location, so as to change the first display contents of the display elements 10 to the second display contents, for example, changing vehicle bodies to a warning color and displaying a warning sign in an exclamation mark (as vehicles traveling southbound having appearances of vehicle bodies indicated in dotted lines in FIG. 8). At this point, the general public can acquire the warning from the second display contents of the non-specific vehicles so as to allow the general public to readily evacuate or take disaster relief measures.

Figure 11:
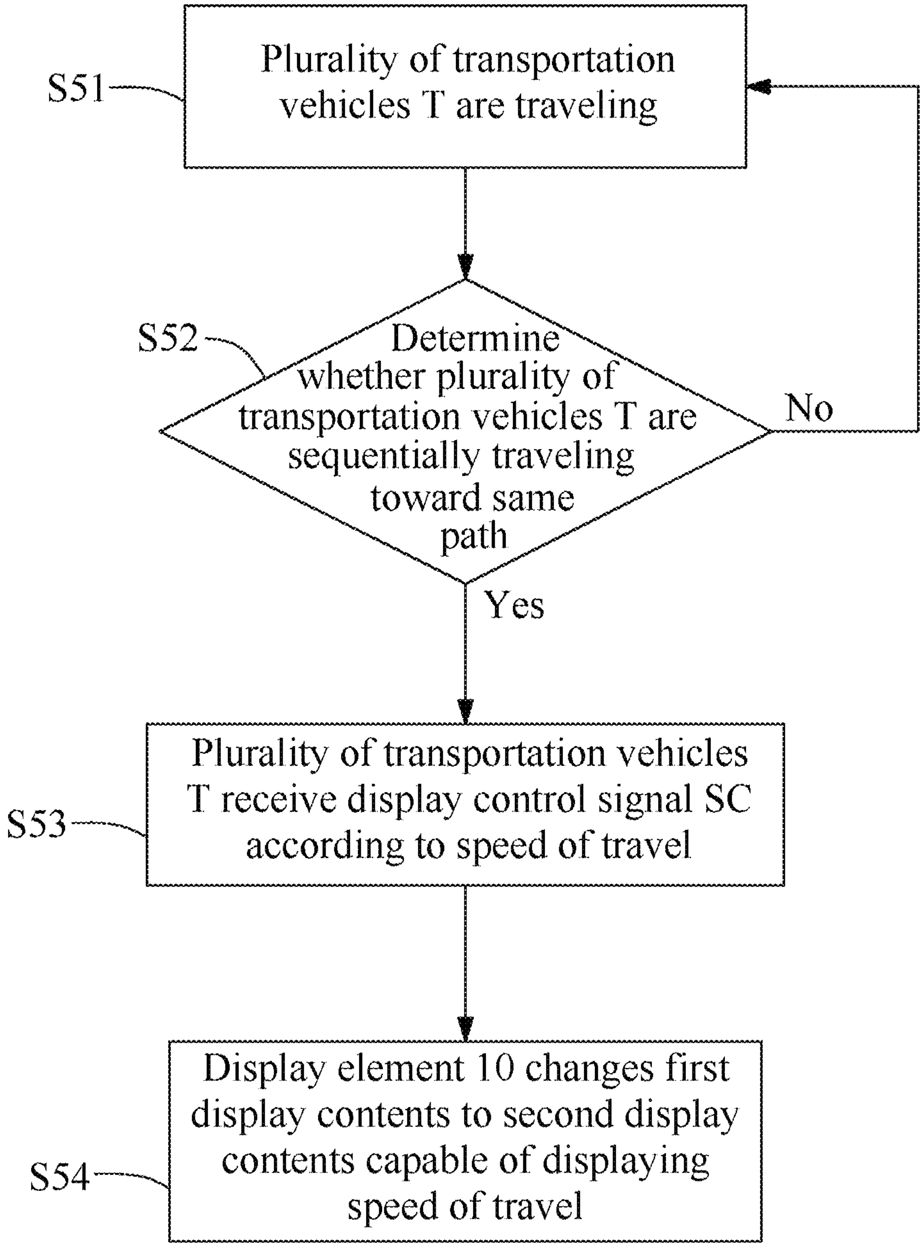
FIG. 11 is a flowchart of steps according to a fourth embodiment of the present disclosure.

FIG. 11 shows a flowchart of a display method according to a fourth embodiment of the present disclosure. The plurality of transportation vehicles T are traveling (step S51), and it is determined whether the plurality of transportation vehicles T are traveling sequentially toward a same path (step S52). If a result of the determination is "yes", the predetermined condition is satisfied by the transportation vehicles T, the plurality of transportation vehicles T receive the control signal SC according to a speed of travel (step S53), and the display elements 10 of the plurality of transportation vehicles T change the first display contents to the second display contents capable of display the speed of travel (step S53). If the result of the determination is "no", the display method 100 returns to step S51.

Figure 12:
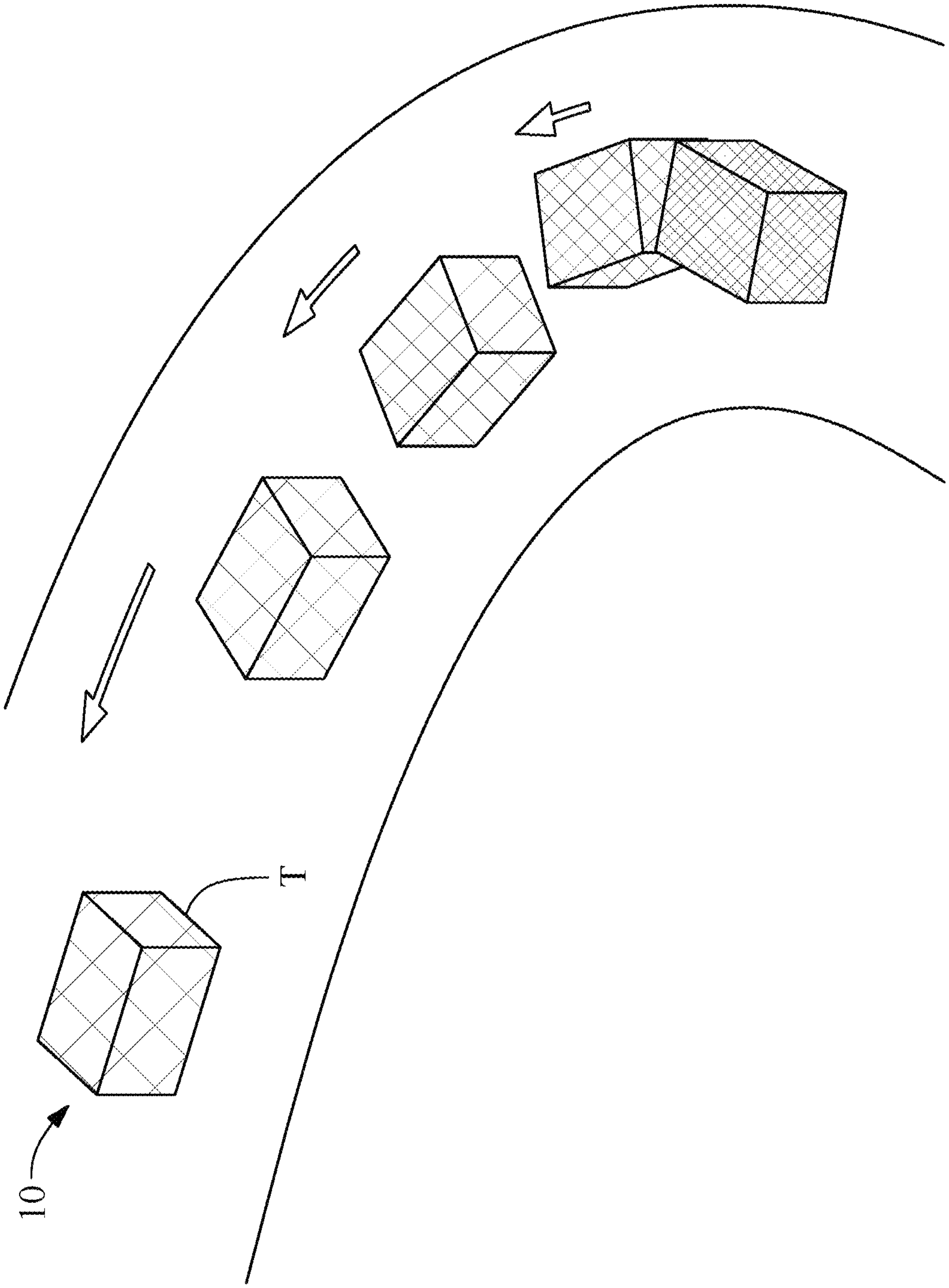
FIG. 12 is a schematic diagram of a scenario of a traffic jam of transportation vehicles according to the fourth embodiment of the present disclosure.

As shown in FIG. 12, in the fourth embodiment, the plurality of transportation vehicles T are a non-specific group of vehicles traveling on the highway in a scenario of a traffic jam caused by a large number of vehicles, and the predetermined condition is satisfied by the non-specific group of vehicles sequentially traveling toward a same path. At this point, the non-specific group of vehicles can receive the control signal according to the speed of travel, and the display elements 10 change the first display contents to the second display contents capable of displaying the speed of travel. When the non-specific group of vehicles display the second display contents in this embodiment, the speed of travel is displayed in a color gradient according to the speed of the vehicle itself. For example, a color gradient sequentially composed of red, orange and green indicates the speed of the vehicle is from extremely low, low, medium, high to extremely high, and the color is represented by the color gradient of red, orange and green in grid lines from dense to sparse in FIG. 12.

As shown in FIG. 12, vehicle G, vehicle H, vehicle I, vehicle J and vehicle K are five vehicles sequentially traveling on the highway. The second display contents of the vehicle G are red and indicate an extremely low speed (for example, 5 to 15 km/hour), the second display contents of vehicle H are alternatively red and orange and indicate a low speed (a speed of, for example, 15 to 30 km/hour), the second display contents of vehicle I are orange and indicate a medium speed (a speed of, for example, 30 to 50 km/hour), the second display contents of vehicle J are alternately orange and green and indicate a high speed (a speed of, for example, 50 to 80 km/hour), and the second display contents of vehicle K are green and indicate an extremely high speed (a speed of, for example, 80 to 110 km/hour). Thus, even if at nighttime or on rainy days when visibility is poor, in case of a traffic jam of the non-specific group of vehicles on the highway, conditions of the traffic jam ahead and behind can be observed from the second display contents so as to better make a subsequent decision, for example, making a detour.

The embodiments above are examples of the display method for collectively changing display contents of transportation vehicles of the present disclosure. Display applications of individual transportation vehicles to be described below.

FIG. 13A to FIG. 13D show a fifth embodiment of the present disclosure in a scenario of an event of a breakdown caused by a collision. The transportation vehicle T in this embodiment is the vehicle of the collision, the body shell of this vehicle is arranged with a plurality of impact sensors 40 (referring to FIG. 2) uniformly distributed on the body shell, and the predetermined condition is satisfied by the vehicle when the impact sensor 40 receives an impact. At this point, an impact signal S1 is triggered and is received by the smart display device 200 to control the display element 10 to display the second contents. The second display contents are in significant contrast with the first display contents, and the second display contents include at least a sign and/or a text, for example, a warning sign in an exclamation mark displayed in orthographic projection in a triangle frame shown in FIG. 13A, so as to provide a warning.

Figure 13A:
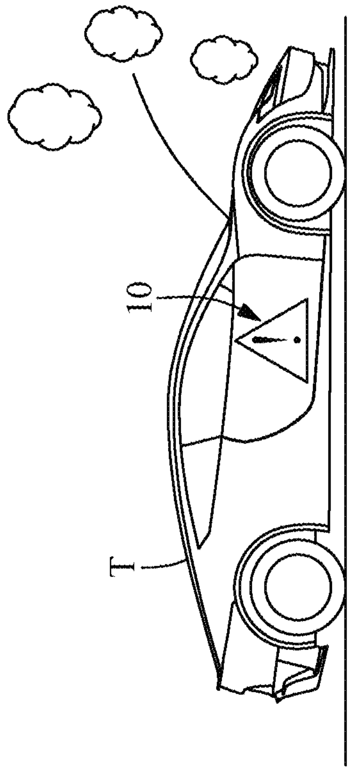
FIG. 13A to FIG. 13D are schematic diagrams of a scenario of a vehicle breakdown due to a collision of a transportation vehicle according to a fifth embodiment of the present disclosure.
Figure 13B:
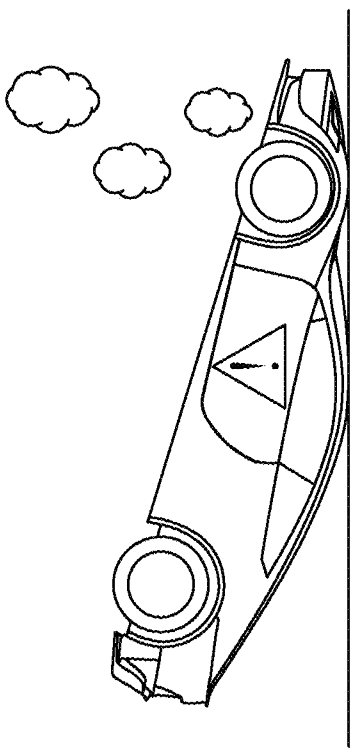
Figure 13C:
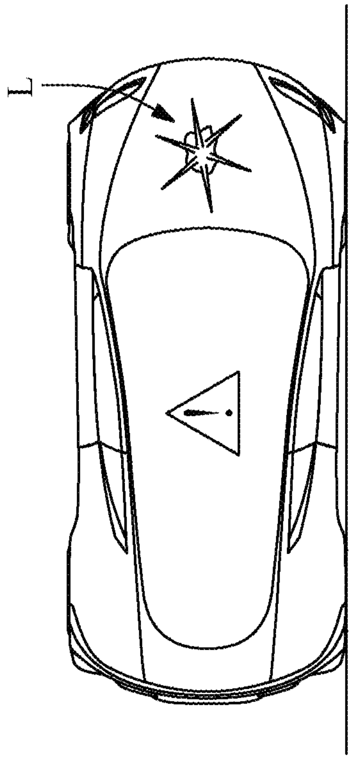
Figure 13D:
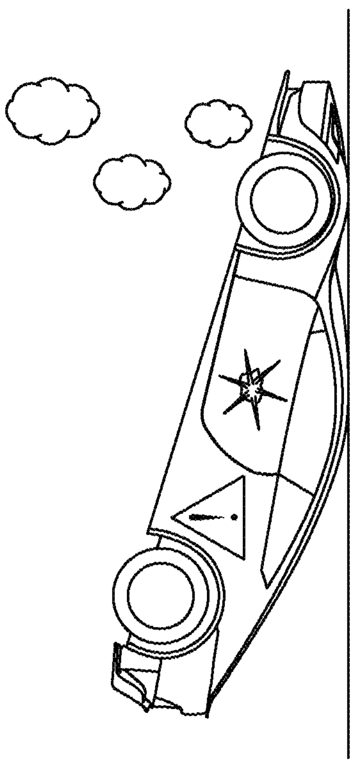

Moreover, each vehicle in this embodiment is also provided with an attitude sensor 50 operable to detect a first attitude (as shown in FIG. 13A) in normal use and a second attitude (for example, as shown in FIG. 13B to FIG. 13D) different from the first attitude. When the attitude sensor 50 detects that the attitude of a vehicle is the second attitude, for example, the vehicle turned over by 180 degrees in FIG. 13B such that the second attitude differs from the first attitude by an angle of 180 degrees, the second display contents at this point are adjusted to the warning sign similarly displayed in orthographic projection shown in FIG. 13A. As shown in FIG. 13C, when the attitude sensor 50 detects that the attitude of a vehicle is the second attitude, for example, turned by 90 degrees as in the drawing or as the vehicle turned by 180 degrees in FIG. 13D, the smart display device 200 defines a damaged region L on the body shell according to the received impact signal S1. At this point, display of the second display contents at the display element 10 avoids the damaged region L, and the second display contents are displayed in a region other than the damaged region L, as shown in FIG. 13C or FIG. 13D. Moreover, the vehicle turned by 90 degrees shown in FIG. 13C is in the second attitude having an angle difference of 90 degrees from the first attitude, and has an attitude difference from a horizontal placement to a lateral placement. At this point, in addition to avoiding the damaged region L, the second display contents are also displayed on the top of the vehicle along with the attitude difference. The warning signs in FIG. 13C and FIG. 13D are similarly adjusted to display in orthographic projection.

Figure 14:
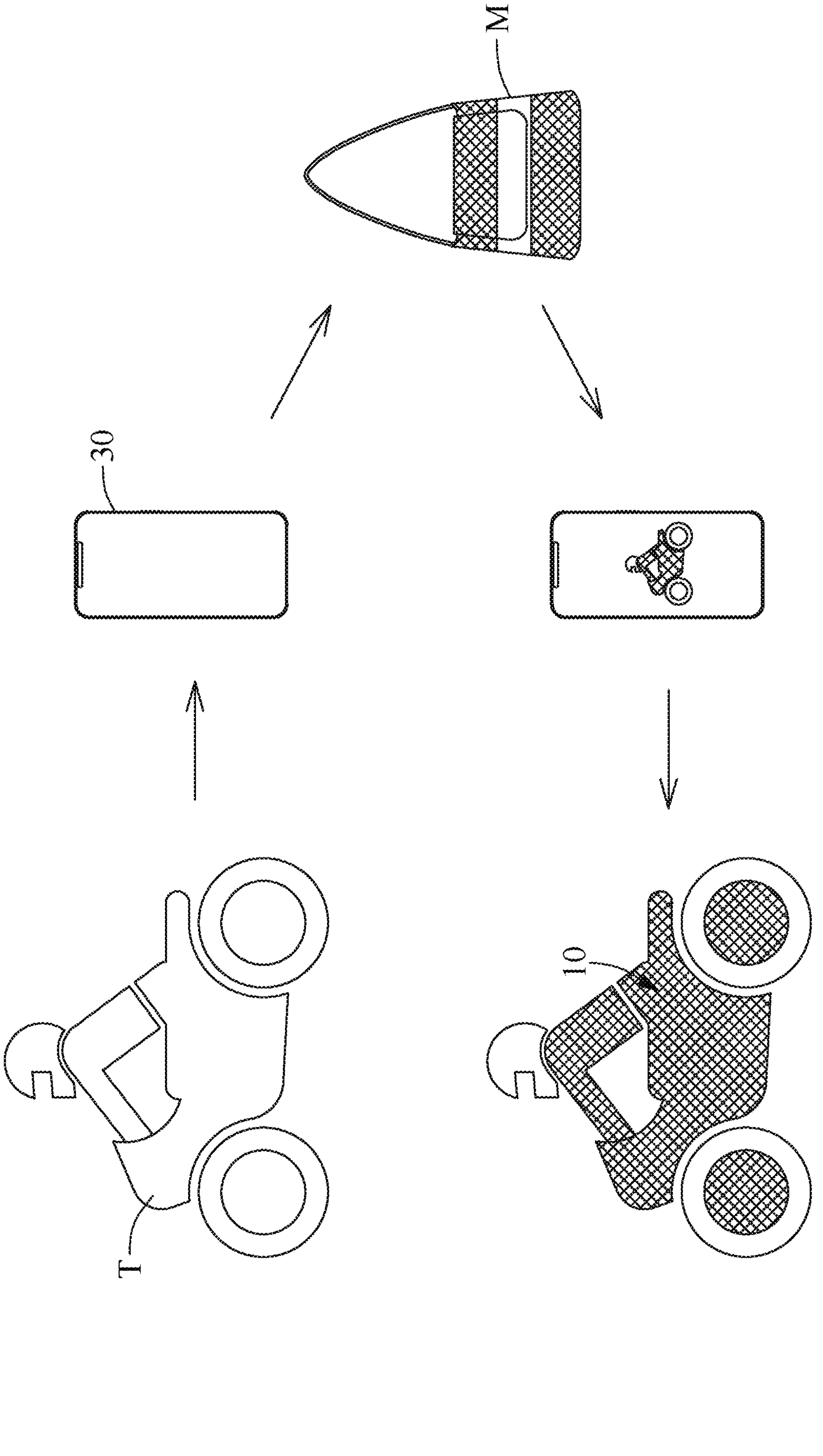
FIG. 14 is a schematic diagram of a scenario of changing an appearance of transportation vehicle according to an accessory according to a sixth embodiment of the present disclosure.

FIG. 14 shows a sixth embodiment of the present disclosure, in which the smart processing unit 20 can be communicatively connected to a terminal device 300 according to an appearance of an accessory M, and can capture an image of the accessory M via the terminal device 300 and transmit the image to the smart processing unit 20. The smart processing unit 20 analyzes the appearance of the accessory M; for example, the accessory M of this embodiment is a backpack and has a pattern composed of intersection diagonal lines. Contents of the analyzed image are converted to the second display contents, for the display element 10 to use and display the second display contents as the appearance of the vehicle.

Figure 15A:
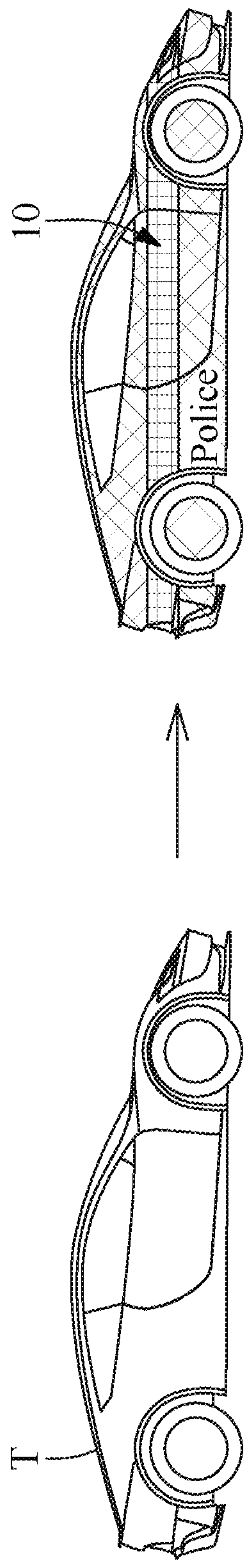
FIG. 15A and FIG. 15B are schematic diagrams of changing an appearance of a vehicle body of a transportation vehicle according to a designation provided by an administrator according to a seventh embodiment of the present disclosure.
Figure 15B:
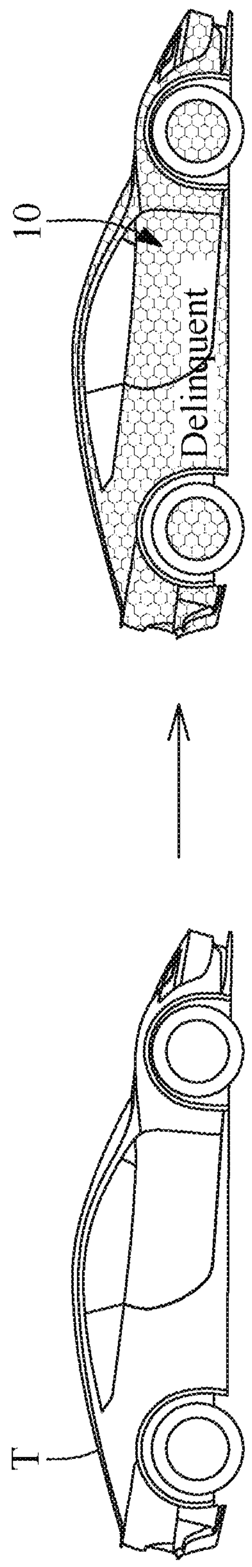
Figure 16:
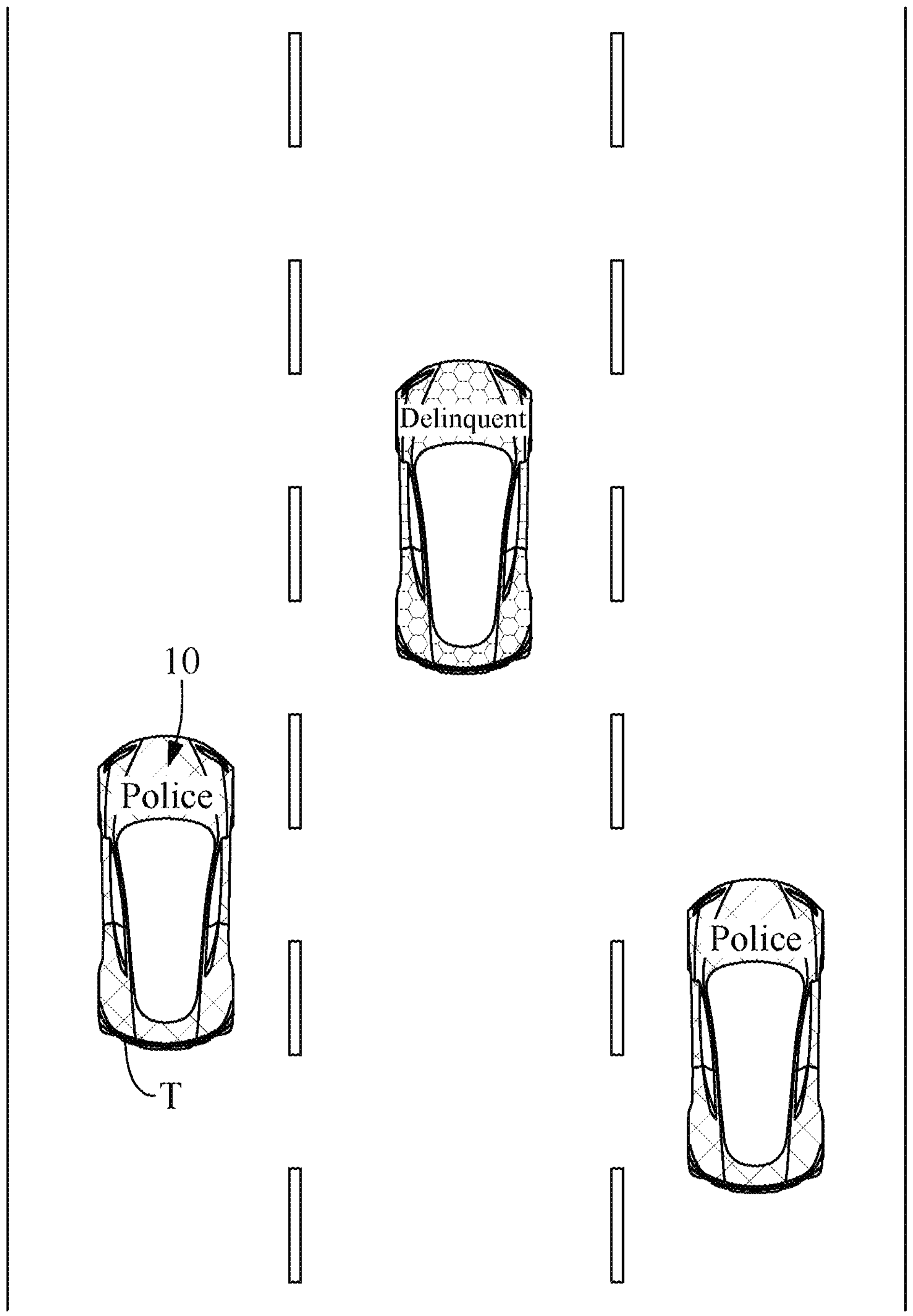
FIG. 16 is a schematic diagram of a scenario of a police chase for delinquents according to a seventh embodiment of the present disclosure.

FIG. 15A to FIG. 16 show a seventh embodiment of the present disclosure of a scenario in which police recruit civilian cars to chase delinquents fleeing in a vehicle. In this embodiment, assume that each transportation vehicle T is provided with an identity identification element 60 operable to identify identity information S2 of a user, the predetermined condition is satisfied by a user with a designation provided by an authorized administrator according to the identity information, and the central control system 400 displays the second display contents at the transportation vehicle T where the user is located according to the designation. The identity identification element 60 is an image identification element in an embodiment and is operable to capture and identify the image of the user to generate the identity information S2.

In this embodiment, the police is the authorized administrator who can connect to the central control system 400 via the terminal device 300 (for example, a smartphone) to request to display the second display contents with a police sign at the recruited vehicle, for example, changing the appearance of the vehicle body of the civilian vehicle to the appearance of the vehicle body of a police vehicle (as the appearance of the vehicle body shown in FIG. 15A), or displaying the text of "police", for better identification by others and to avoid accordingly. With a camera in the vehicle driven by the delinquent, a face image of the delinquent can be acquired to generate the identity information thereof. The central control system 400 can obtain, according to the identity information, vehicle registration information of the vehicle driven by the delinquent. Then, the administrator locks the positioned location SL of the vehicle driven by the delinquent, and specifies the appearance of the vehicle body to be changed to the second display contents, for example, changing to the appearance of the vehicle body to red (as the appearance of the vehicle body shown in FIG. 15B) or again showing the text of "delinquent". In the scenario as shown in FIG. 16, the general public can easily identify differences between police vehicles and normal vehicles, and the police can also easily identify the location of delinquents.

Figure 17B:
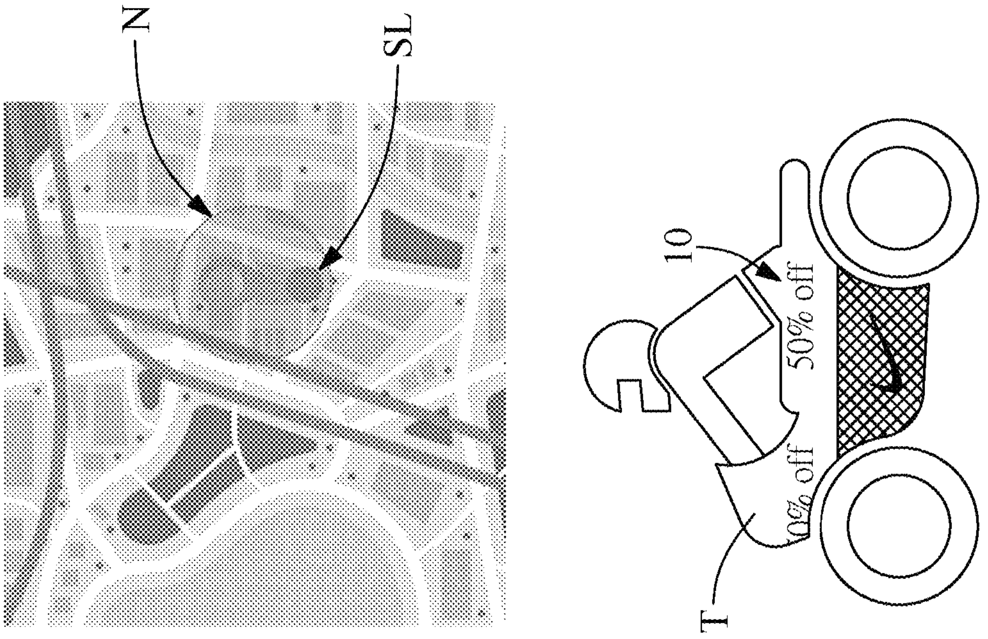
FIG. 17A and FIG. 17B are schematic diagrams of a scenario of broadcasting advertising contents when a transportation vehicle enters an advertising region according to an eighth embodiment of the present disclosure.
Figure 17A:
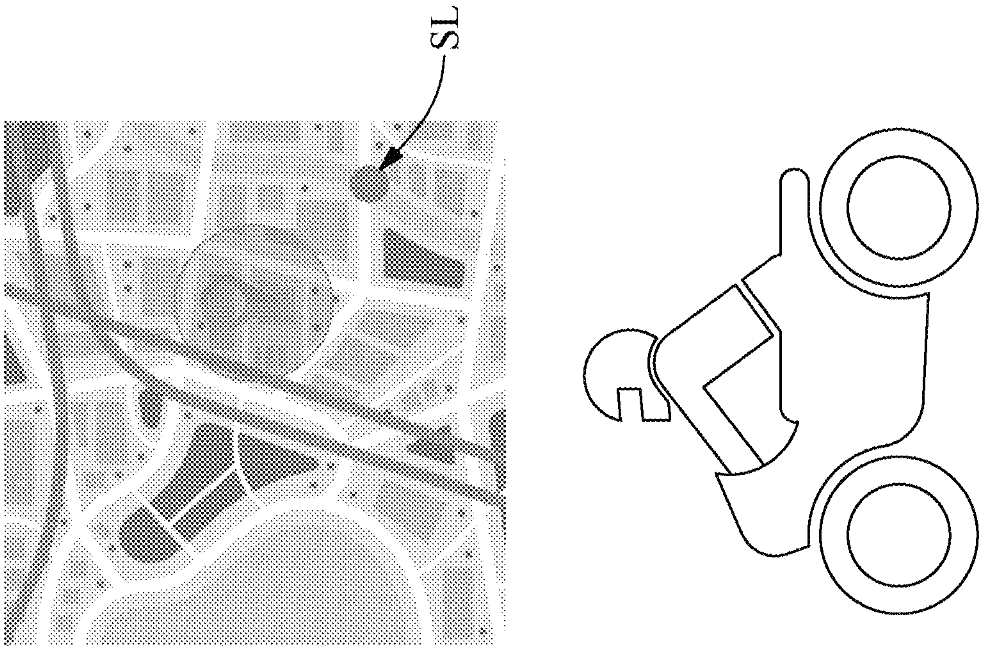

FIG. 17 shows an eighth embodiment of the present disclosure of scenario in which advertising contents are broadcast when a specific motorcycle enters an advertising region. The second display contents are bound to an advertising information paid by a partner merchant, the advertising information is at least one of advertisement broadcast, brand promotion and commercial promotion, and the transportation vehicle T displays the second display contents when the positioned location SL of any one of the transportation vehicles T obtained by the central control system 400 is within an advertising region of the partner merchant. Assume that the partner merchant with in the advertising region N is currently holding a promotion, the second display contents are a promotional advertisement of the partner merchant, and the route of a motorcycle on the road is to pass by the advertising region N (as shown in FIG. 17A). At this point, the central control system 400 determines, according to the positioned location SL and the direction of travel returned by the motorcycle, that the predetermined condition is satisfied by the motor cycle entering a designated region (as shown in FIG. 17B). The central control system 400 automatically issues the display control signal SC that is then received by the motorcycle, so as to broadcast the advertisement of a designated merchant within the advertising region by the display element 10. The driver can accordingly obtain a corresponding reward, for example, reimbursement in cash or riding points.

It is obviously seen from the description that the present disclosure is characterized in that, in the event of a requirement of collectively changing display contents of a vehicle T, by performing the display method, the smart display device 200 of the present disclosure can obtain the positioned locations SL of a plurality of the transportation vehicles T by the central control system 400. Moreover, when the predetermined condition capable of meeting the requirement is satisfied, the central control system 400 issues the display control signal SC that is then automatically received by the transportation vehicles T at the positioned locations SL. The display elements 10 of the transportation vehicles T receiving the display control signal SC can all change the first display contents to the second display contents, hence achieving the effects of collectively changing display contents of the transportation vehicles T and allowing the display contents of the transportation vehicles T to be consistent so as to meet the requirement.

In addition to satisfying the requirement of collectively changing display contents, the display method of the present disclosure can also be applied to change the first display contents to the second display contents, so as to change display contents of individual transportation vehicles T according to needs to individual users, for example, as the application of provide a warning for a vehicle breakdown as described in the fifth embodiment, or as the application of changing the appearance of the vehicle body according to the appearance of an accessory, thereby meeting user expectations.

In addition to satisfying the requirement of collectively changing display contents, the display method of the present disclosure can also be applied to change the first display contents to the second display contents, so as to change display contents of individual transportation vehicles T according to needs of emergencies, for example, as the application of changing the appearances of the vehicle bodies of the vehicle driven by delinquents and the civilian vehicles recruited by the police as in the seventh embodiment. Alternatively, the change of the first display contents to the second display contents can also be applied to broadcast of commercial advertising, that is, as the application of broadcasting advertisement contents in the advertising region as in the eighth embodiment, thereby meeting expectation of the user.

The present invention is described by way of the preferred embodiments above. A person skilled in the art should understand that, these embodiments are merely for describing the present invention are not to be construed as limitations to the scope of the present invention. It should be noted that all equivalent changes, replacements and substitutions made to the embodiments are to be encompassed within the scope of the present invention. Therefore, the scope of protection of the present invention should be accorded with the broadest interpretation of the appended claims.

What is claimed is:

1. A display method for collectively changing display contents of a plurality of transportation vehicles, a body shell of each of the transportation vehicles comprising a display element, the changing of the display contents performed by a smart display device; the display method comprising:

setting first display contents of the display element for the display element to normally display the first display contents;

setting second display contents of the display element, the second display contents being different from the first display contents;

obtaining positioned locations of the transportation vehicles by a central control system; and when any one of the transportation vehicles satisfies a predetermined condition, the central control system issuing a display control signal to the transportation vehicle which satisfies the predetermined condition according to the respective positioned location, and the respective smart display device of the transportation vehicle which satisfies the predetermined condition automatically receiving the display control signal for the display element to change the first display contents to the second display contents, so that one or more of the transportation vehicles can collectively change the display contents, wherein the first display contents or the second display contents are one or a combination of two or more of a color, a sign, a text and a pattern, and at least one of the color, the sign, the text and the pattern of the second display contents is different from the first display contents, and wherein each of the transportation vehicles comprises a plurality of impact sensors uniformly distributed on the body shell thereof, and each of the transportation vehicles generates an impact signal triggered by an impact against the impact sensors, the smart display device defines a damaged region on the body shell according to the impact signal received, the second display contents at least include the sign and/or the text, and each of the transportation vehicles displays the second display contents in a region other than the damaged region, wherein the second display contents are in significant contrast with the first display contents.

2. The display method for collectively changing display contents of a plurality of transportation vehicles according to claim 1, wherein the plurality of transportation vehicles set a gathering range according to the positioned location of at least one of the transportation vehicles, the predetermined condition is satisfied by any one of the plurality of transportation vehicles entering the gathering range, and the display element of the transportation vehicle which satisfies the predetermined condition receives the display control signal and changes the first display contents to the same second display contents.

3. The display method for collectively changing display contents of a plurality of transportation vehicles according to claim 2, wherein when any one of the transportation vehicles within the gathering range automatically receives the display control signal, a user of the transportation vehicle performs a confirmation for allowing display contents change via an operating interface, and the display element of the transportation vehicle then changes the first display contents to the second display contents.

4. The display method for collectively changing display contents of a plurality of transportation vehicles according to claim 1, wherein the plurality of transportation vehicles are currently traveling, an accident location is defined by the positioned location of at least one of the plurality of transportation vehicles, the predetermined condition is satisfied by one of the plurality of transportation vehicles that travels in a direction away from the accident location, and the display element of the transportation vehicle changes the first display contents to the second display contents, so as to display the second display contents to the transportation vehicle traveling in a direction approaching the accident location.

5. The display method for collectively changing display contents of a plurality of transportation vehicles according to claim 1, wherein the plurality of transportation vehicles are traveling or still, the predetermined condition is satisfied by the plurality of transportation vehicles located at a geographic location with an occurrence of a disaster, the central control system sends the display control signal to any one of the transportation vehicles at the geographic location, and the display element of the transportation vehicle that receives the display control signal individually changes the first display contents to the same second display contents.

6. The display method for collectively changing display contents of a plurality of transportation vehicles according to claim 1, wherein the predetermined condition is satisfied by the plurality of transportation vehicles traveling sequentially toward a same path, the plurality of transportation vehicles receive the control signal according to a speed of travel, and the display elements of the plurality of transportation vehicles change the first display contents to the second display contents capable of displaying the speed of travel.

7. The display method for collectively changing display contents of a plurality of transportation vehicles according to claim 6, wherein when the plurality of transportation vehicles display the second display contents, each of the plurality of transportation vehicles displays the speed of travel in a color gradient according to a speed thereof.

8. The display method for collectively changing display contents of a plurality of transportation vehicles according to claim 1, wherein each of the transportation vehicles is provided with an attitude sensor operable to detect a first attitude in normal use and to detect a second attitude different from the first attitude, and the sign and/or text of the second display contents is displayed in orthographic projection when the attitude sensor detects that the vehicle where it is located is at the first attitude; alternatively, when the attitude sensor detects that the transportation vehicle where it is located is at the second attitude, the sign and/or text of the second display contents is adjusted according to an angle difference and/or orientation difference of the second attitude with respect to the first attitude and is similarly displayed in orthographic projection.

9. The display method for collectively changing display contents of a plurality of transportation vehicles according to claim 1, wherein each of the transportation vehicles is provided with an identity identification element operable to identify identity information of a user, the predetermined condition is satisfied by a user with a designation provided by an authorized administrator according to the identity information, and the central control system displays the second display contents at the transportation vehicle where the user is located according to the designation.

10. The display method for collectively changing display contents of a plurality of transportation vehicles according to claim 9, wherein the identity identification element is an image identification element operable to capture and identify an image of the user so as to generate the identification information.

11. The display method for collectively changing display contents of a plurality of transportation vehicles according to claim 9, wherein the second display contents are bound to advertising information paid by a partner merchant, the advertising information is at least one of advertisement broadcast, brand promotion and commercial promotion, and the transportation vehicle displays the second display contents when the positioned location of any one of the transportation vehicles obtained by the central control system is within an advertising region of the partner merchant.

12. A smart display device for collectively changing display contents of a plurality of transportation vehicles, comprising:

a display element, disposed on a body shell of each of the transportation vehicles, operable to display first display contents and second display contents; and a smart processing unit, electrically connected to the display element, operable to set the first display contents and the second display contents different from the first display contents;

the smart processing units of the plurality of transportation vehicles are operable to be communicatively connected to a central control system, each of the transportation vehicles comprises a positioning unit operable to provide a positioned location to the central control system, when any one of the transportation vehicles satisfies a predetermined condition, the central control system issues a display control signal to the transportation vehicle which satisfies the predetermined condition according to the respective positioned location, and the respective smart processing unit of the transportation vehicle which satisfies the predetermined condition automatically receives the display control signal for the display element to change the first display contents to the second display contents, so that one or more of the transportation vehicles can collectively change the display contents, wherein each of the transportation vehicles is arranged with one or more impact sensors on the body shell thereof, the impact sensor is electrically connected to the smart processing unit, each of the transportation vehicles generates an impact signal triggered by an impact against the impact sensor, and the smart processing unit receives the impact signal and displays the second display contents by the display element thereof, wherein the second display contents are in significant contrast with the first display contents.

13. The smart display device for collectively changing display contents of a plurality of transportation vehicles according to claim 12, wherein each of the transportation vehicles is provided with an attitude sensor operable to detect a first attitude in normal use and to detect a second attitude different from the first attitude, and the second display contents are displayed in orthographic projection when the attitude sensor detects that the vehicle where it is located is at the first attitude; alternatively, when the attitude sensor detects that each of the transportation vehicles where it is located is at the second attitude, the second display contents are adjusted according to an angle difference and/or orientation difference of the second attitude with respect to the first attitude and are similarly displayed in orthographic projection.

14. The smart display device for collectively changing display contents of a plurality of transportation vehicles according to claim 12, wherein each of the transportation vehicles is provided with an identity identification element operable to identify identity information of a user, the predetermined condition is satisfied by a user with a designation provided by an authorized administrator according to the identity information, and the central control system displays the second display contents at each of the transportation vehicles where the user is located according to the designation.

15. The smart display device for collectively changing display contents of a plurality of transportation vehicles according to claim 14, wherein the identity identification element is an image identification element operable to capture and identify an image of the user so as to generate the identification information.

16. A non-transitory computer-readable recording medium, storing a program having a plurality of executable codes for a smart display device to perform the method according to claim 1 when the executable codes are read by the smart display device.

* * * * *